United States Patent

McGee

[15] 3,693,381
[45] Sept. 26, 1972

[54] TORQUE RESPONSIVE CLUTCH

[72] Inventor: Harold E. McGee, Loves Park, Ill.
[73] Assignee: Hill-Rockford Co., Rockford, Ill.
[22] Filed: Feb. 12, 1971
[21] Appl. No.: 114,916

Related U.S. Application Data

[62] Division of Ser. No. 829,650, June 2, 1969.

[52] U.S. Cl. ................................. 64/29, 81/52.4 A
[51] Int. Cl. ............................................. F16d 7/06
[58] Field of Search ................... 64/29, 30; 81/52.4

[56] References Cited

UNITED STATES PATENTS

| | | | |
|---|---|---|---|
| 2,854,831 | 10/1958 | Rothweiler | 64/29 |
| 3,451,514 | 6/1969 | Ristow | 64/29 X |
| 2,475,518 | 7/1949 | Ristow | 64/29 |

*Primary Examiner*—Edward G. Favors
*Attorney*—Andrew F. Wintercorn

[57] ABSTRACT

This torque responsive clutch involves the use of a larger central steel ball and three slightly smaller steel balls, the central ball being under a predetermined spring pressure toward the other balls to hold them in a drive position in relation to and between driving and driven members, whereby, when sufficient resistance to turning of the driven member occurs, the clutch is automatically released. The three drive transmitting balls operate in radial holes in one of said relatively rotatable members and engage in radial recesses in the other member. A trip rod through which spring pressure is applied to the central ball operates control means to disconnect drive from the driving member. A control lever pivoted at one end has spring pressure applied to the other end and applies increased spring pressure to the trip rod at a point intermediate its ends, the lever in turn controlling a drive means driving the drive member. The clutch was especially designed for driving the bit of power operable screwdriver.

8 Claims, 5 Drawing Figures

INVENTOR:
HAROLD E. McGEE

INVENTOR:
HAROLD E. McGEE

TORQUE RESPONSIVE CLUTCH

This application is a division of my copending application, Ser. No. 829,650, filed June 2, 1969.

This invention relates to a mechanically operable torque gauge or clutch, and, while the construction herein shown was specially designed and is adapted for automatically shutting off pneumatic power to a power-operated screwdriver by switch or valve control when the screw is driven home or in the event, for example, of a jam due to cross-threading, the torque responsive clutch is adapted for many other uses.

A salient feature of the present clutch is the employment of a central ball reciprocable in a bore and bearing upon a plurality of drive-transmitting balls that are reciprocable in radial holes communicating with the bore to spread the balls to drive position projecting as drive keys from these radial holes, the central ball being urged in a forward direction under a predetermined spring pressure so that when the drive-transmitting balls encounter more than a predetermined resistance to torque they are withdrawn from drive position automatically.

The invention is illustrated in the accompanying drawings, in which.

The same reference numerals are applied to corresponding parts throughout these views.

Figure 1:
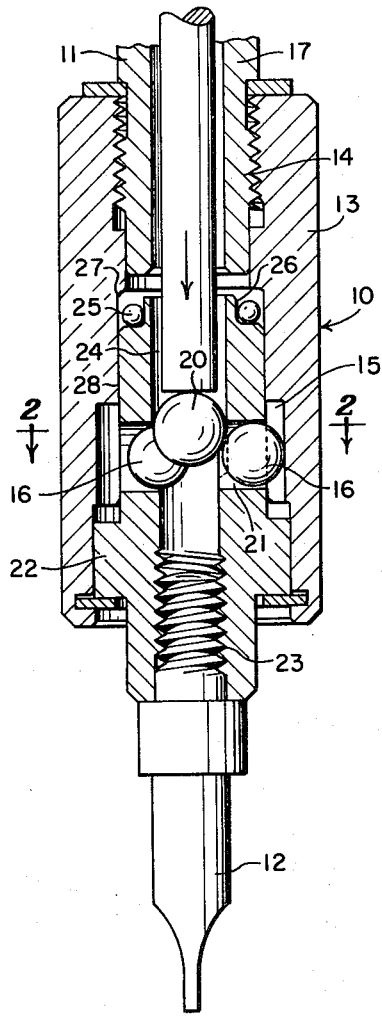
FIG. 1 is a longitudinal section through a torque-responsive clutch made in accordance with my invention with the clutch parts shown in drive-transmitting relationship.
Figure 2:
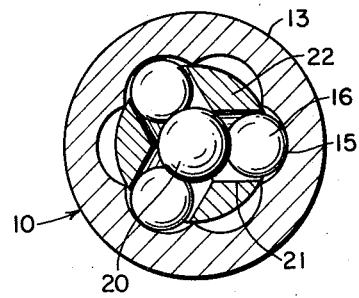
FIG. 2 is a cross-section on the line 2—2 of FIG. 1.
Figure 3:
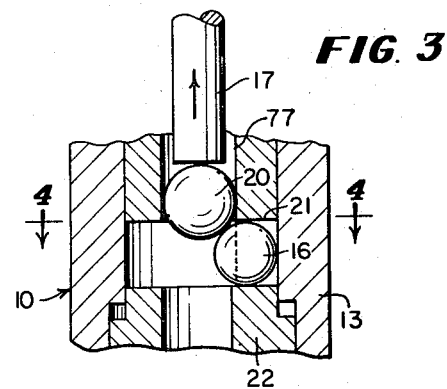
FIG. 3 is a sectional detail corresponding to a portion of FIG. 1 but showing the parts in the power-off position following torque overload.
Figure 4:
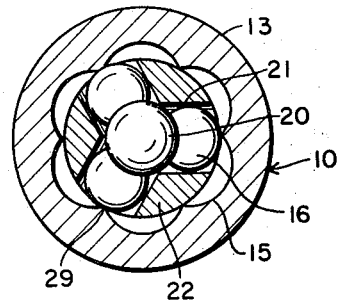
FIG. 4 is a section on the line 4—4 of FIG. 3.

The clutch of my invention is designated by the reference numeral 10 in FIG. 1–5 and, as best appears in FIG. 1–4, is provided between the hollow drive rod 11 and the screwdriver bit 12, the housing 13 for the clutch being fixed to the lower end of the drive rod as shown at 14. The housing 13 has six identical arcuate recesses 15 provided therein, into any three alternate ones of which the three balls 16 are engaged to serve as drive keys under spring pressure exerted on the clutch control or trip rod 17 by spring 18 (FIG. 5) and pressure multiplication lever 19, the pressure being exerted on balls 16 evenly through the slightly larger central ball 20. The balls 16 are guided for radial movement in three evenly spaced radial holes 21 provided in a drive plug 22 that is fixed to the threaded shank of the screwdriver bit 12, as shown at 23 in FIG. 1. Plug 22 has the upper end 24 of its axial bore enlarged for guidance of the larger central ball 20 in coaxial relationship to the clutch control or trip rod 17. A plurality of smaller anti-friction bearing balls 25 operate in a circular raceway provided externally of the reduced upper end portion 26 of the plug 22, and, so long as the screwdriver bit 12 is being driven and there is downward pressure from the drive rod 11 through the clutch housing 13 and drive balls 16 to plug 22, the bearing balls 25 perform no function, but as soon as the torque-responsive clutch 10 releases, due to the inward thrust on the balls 16 being sufficient to overcome the downward thrust of the clutch control rod 17 on the central ball 20, the balls 25 work between the raceway on the end 26 of plug 22 and a companion raceway 27 provided at the inner end of the bore 28 of the clutch housing 13, so that the housing 13 can turn freely relative to the screwdriver bit 12 and its drive plug 22, the balls 16 then remaining, as seen in FIG. 4, inside the circle of bore 28 on which lie the points 29 defined between the arcuate recesses 15. The engaged condition of the clutch is shown clearly in FIG. 1 and 2, while the disengaged condition is clearly shown in FIGS. 3 and 4, the arrows in FIG. 3 clearly indicating the inward movement of the three balls 16, and how the upward movement of the central larger ball 20 causes upward movement of the clutch control rod 17 at the point of release of the clutch to operate the switch 30 and shut off the drive motor 31.

Spring pressure on the trip rod 17 is accurately predetermined by the adjustment of the cap 67 relative to the sleeve 68 in which the spring 18 is housed along with plunger 69 in a fixed relationship to pivot 70 for one end of control lever 19, a mechanical advantage being derived for spring 47 by reason of its pressing downwardly against the top of the lever 19 near its free end, keeping the plunger 71 of the switch or valve 30 depressed against its normal tendency to raise the lever 19. Thus, a fine adjustment as to torque measurement setting is possible by simply adjusting the cap 67. The control lever 19 has ant-friction point contact on its under side with a single large ball 72 resting on the upper end of the trip rod 17. Obviously, therefore, in adjusting the cap 67, the operator predetermines the spring loading on a large ball 20 disposed under the lower end of the trip-rod 17 that in turn transmits pressure to the drive transmitting balls 16 of the torque-responsive clutch 10.

Figure 5:
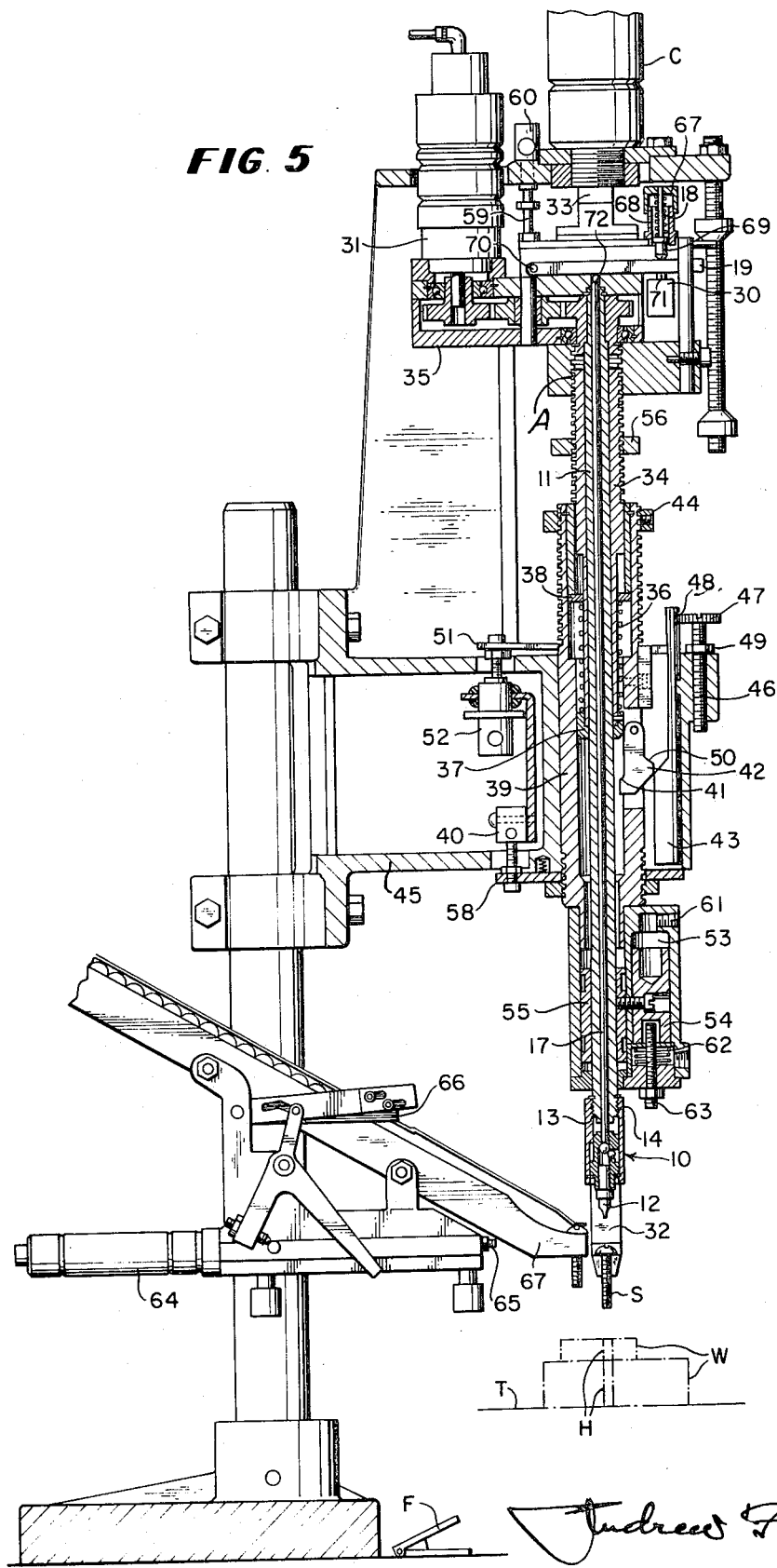
FIG. 5 is a vertical section through a power screwdriver using the torque-responsive clutch in connection with the screwdriver bit on the lower end of its hollow drive rod.

The operation of the clutch 10, when used in a power screwdriver, is best explained by reference to FIG. 5. At the start of a cycle, a screw S is loosely disposed between a pair of jaws 32 in axially aligned relation to the screwdriver bit 12, and the bit is not rotating but disposed nearby in retracted position relative to the screwhead as appears in FIG. 1. The operator has workpieces to be fastened together with screws, and he places such workpieces W on a table T with their holes H aligned with one another and with the shank of the screw S. He then presses a foot switch F to cause piston 33 in the ram cylinder C to move the ram 34 downwardly along with its gear housing 35 and drive motor 31. Spring 36, being compressed to a predetermined preload between the collar 37 and washer 38, keeps the jaw carrier sleeve 39 elevated, holding limit switch or valve 40 depressed. Continued downward movement of ram 34 causes collar 37 on the lower end of ram 34 to contact shoulder 42 of dog 42, which, being restricted in its swinging movement outwardly by an adjustable backup plate 43, serves to connect the jaw carrier sleeve 39 with the ram 34 to move down with the ram until the stop collar 44 limits further movement, that being when dog 42 is pushed out of the way by collar 37 into place under plate 43. The latter is adjustable vertically relative to the frame 45 by means of a screw 46 inserted in the frame and having its head 47 engageable in any one of a plurality of vertically spaced notches 48 provided in the backup plate 43. This adjustment and the adjustment of stop nut 44 are both taken care of at the same time with the adjustment of ram 34 at A, these adjustments being to suit different lengths of screws S. A lock nut 49 secures the screw 46 in its adjusted position. Further downward movement of the ram 34 carries the sleeve 39 with it, spring 36 under these conditions preventing the sleeve from advancing any faster than the ram. Upon this downward movement of the sleeve 39 with ram 34, limit switch or valve 40 is released, starting the drive motor 31, so that the bit 12 can engage in the slot in screw S while turning only slowly, this avoiding damage to the screw slot. Continued downward movement of the ram 34 with sleeve 39 finally carries the dog 42 past the lower end of backup plate 43, at which point the dog 42 is swung outwardly by collar 37 so that shoulder 50 on the dog engages under plate 43 at the same time that the stop nut 44 strikes plate 51 to operate limit switch or valve 52 and then stops. Operation of the limit switch or valve 52 causes pressure to be applied to the lower portion of the cylinder 53 causing the piston 54 therein to move upwardly and raise the cam 55 and open the jaws 32 to release the screw S, which, by this time, has been guided into the holes H in the workpieces W. Stop nut 56 limits downward movement of the ram 34 in the event there is no screw in the jaws 32, so that bit 12 cannot reach the work and damage it. The ram 34 continues its downward movement relative to sleeve 39, driving the screw S home, whereupon the clutch 10, in response to torque increase above a predetermined valve, is immediately disengaged and switch or valve 30 is operated to shut off the motor 31. Trip rod 17 in this operation is forced upwardly against the load of spring 18 on lever 19 to operate switch or valve 30. The jaws 32 remain open due to friction of screws (not shown) provided on the jaws and bearing on the cam 55, while pressure is directed to the lower end of the cylinder C to cause upward movement of ram 34, in the course of which the dog 42 is disengaged from the bottom of plate 43 when the collar 37 moves upwardly past the lower end of the dog 42, thus allowing the sleeve 39 to rise with the ram 34, releasing the switch or valve 52, the operation of which exhausts the port 57 in cylinder 53. Jaws 32 remain open as the ram 34 continues moving upwardly, the plate 58 on the lower end of sleeve 39 at the limit of upward movement of this sleeve serving to operate the switch or valve 40 to reset the relay for the motor 31 and timer. Ram 34 thereafter continues moving upwardly until finally screw 59 operates switch or valve 60, which (1) causes pressure to be supplied to port 61 of cylinder 53, moving piston 54 therein downwardly against the resistance of spring 62 to engage the stop screw 63, in which position the jaws 32 are held open only long enough for loading of another screw S; (2) admits pressure to the rear end of cylinder 63 so that piston 65 drops the standby screw into the partically open jaws 32, and (3) exhausts port 57 of cylinder 53 and at the same time admits pressure to the forward end of cylinder 64 for the return of piston 65, so that the gate mechanism 66 is operated to drop another screw to the standby position of the one shown at the lower end of chute 67, pressure to port 61 being released at this point also to permit piston 54 and cam 55 to rise to mid-position by action of spring 62 so that the fingers 32 close on the screw by reason of the positioning of an annular shoulder on the cam 55 on dead-center with respect to the previously mentioned screws (not shown) provided on the jaw 32.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In a clutch, a drive member and a driven member in concentric relationship, the central one of said members having radial openings provided therein communicating with an axial bore, the bore having a central ball reciprocable therein and bearing upon drive transmitting balls reciprocable in said radial openings to spread the latter to drive positions projecting as drive keys from said radial openings, the other member having circumferentially arranged radial recesses provided therein to accommodate portions of said drive transmitting balls, power operated means transmitting drive to the drive member and thence through said balls to the driven member, control means for said power operated means operable to power off position in response to a predetermined declutch movement of said central ball, spring means applying a predetermined pressure upon said central ball; whereby said drive transmitting balls are withdrawn from drive position only in response to more than a predetermined torque being transmitted through said clutch, and a trip rod between the spring means and the central ball and engaging the latter to apply the spring pressure thereto, said trip rod in its endwise movement in response to a predetermined declutch movement of said central ball operating said control means to disconnect said power operated means from said drive member.

2. A clutch as set forth in claim 1 Wherein the power operated means transmitting drive to the drive member comprises an electric motor and the control means operable by said trip rod is a switch for opening and closing the electrical circuit for said motor.

3. In a clutch, a drive member and a driven member in concentric relationship, the central one of said members having radial openings provided therein communicating with an axial bore, the bore having a central ball reciprocable therein and bearing upon drive transmitting balls reciprocable in said radial openings to spread the latter to drive positions projecting as drive keys from said radial openings, the other member having circumferentially arranged radial recesses provided therein to accommodate portions of said drive transmitting balls, power operated means transmitting drive to the drive member and thence through said balls to the driven member, control means for said power operated means operable to power off position in response to a predetermined declutch movement of said central ball, spring means applying a predetermined pressure upon said central ball, whereby said drive transmitting balls are withdrawn from drive position only in response to more than a predetermined torque being transmitted through said clutch, a trip rod between the spring means and the central ball and engaging the latter to apply the spring pressure thereto, said trip rod in its endwise movement in response to a predetermined declutch movement of said central ball operating said control means to disconnect said power operated means from said drive member, and a control lever pivoted at one end and having the spring means applying pressure on the other end, said trip rod being maintained under increased spring pressure by said lever at a point intermediate its ends, said lever in turn controlling said power operated drive means driving the drive member.

4. A clutch as set forth in claim 3 wherein the drive means, driving the drive member, comprises an electric motor having a switch for opening and closing the electrical circuit for said motor, the control lever through which increased pressure is applied to the trip rod serving to operate said switch.

5. In a power screwdriver, an outer drive member, an inner driven member in concentric relation to said drive member and having a screwdriver bit turning therewith, the driven member having radial openings provided therein communicating with an axial bore, the bore having a central ball reciprocable therein and bearing upon drive transmitting balls reciprocable in said radial openings to spread the latter to drive positions projecting as drive keys from said radial openings, the driving member having circumferentially arranged radial recesses provided therein to accommodate portions of said drive transmitting balls, power operated means transmitting drive to the drive member and thence through said balls to the driven member, control means for said power operated means operable to power off position in response to a predetermined declutch movement of said central ball, spring means applying a predetermined pressure upon said central ball, whereby said drive transmitting balls are withdrawn from drive position in response to more than a predetermined torque being transmitted through said clutch and a trip rod between the spring means and the central ball and engaging the latter to apply the spring pressure thereto, said trip rod in its endwise movement in response to a predetermined declutch movement of said central ball operating said control means to disconnect said power operated means from said drive member.

6. A power screwdriver as set forth in claim 5 wherein the power operated means transmitting drive to said drive member comprises an electric motor having a switch for opening and closing the electrical circuit for said motor.

7. In a power screwdriver, an outer drive member, an inner driven member in concentric relation to said drive member and having a screwdriver bit turning therewith, the driven member having radial openings provided therein communicating with an axial bore, the bore having a central ball reciprocable therein and bearing upon drive transmitting balls reciprocable in said radial openings to spread the latter to drive positions projecting as drive keys from said radial openings, the driving member having circumferentially arranged radial recesses provided therein to accommodate portions of said drive transmitting balls, spring means applying a predetermined pressure upon said central ball, whereby said drive transmitting balls are withdrawn from drive position in response to more than a predetermined torque being transmitted through said clutch, a trip rod between the spring means and the central ball and engaging the latter to apply the spring pressure thereto, said trip rod in its endwise movement in response to declutch movement of said central ball operating control means to disconnect power operated means from said drive member, and a control lever pivoted at one end and having the spring means applying pressure on the other end, said trip rod being maintained under increased spring pressure by said lever at a point intermediate its ends, said lever in turn controlling a drive means driving the drive member.

8. A power screwdriver as set forth in claim 7 wherein the drive means, driving the drive member, comprises an electric motor having a switch for opening and closing the electrical circuit for said motor, the control lever through which increased pressure is applied to the trip rod serving to operate said switch.

* * * * *